(No Model.)
D. BRISKY.
CULTIVATOR.
No. 552,684. Patented Jan. 7, 1896.
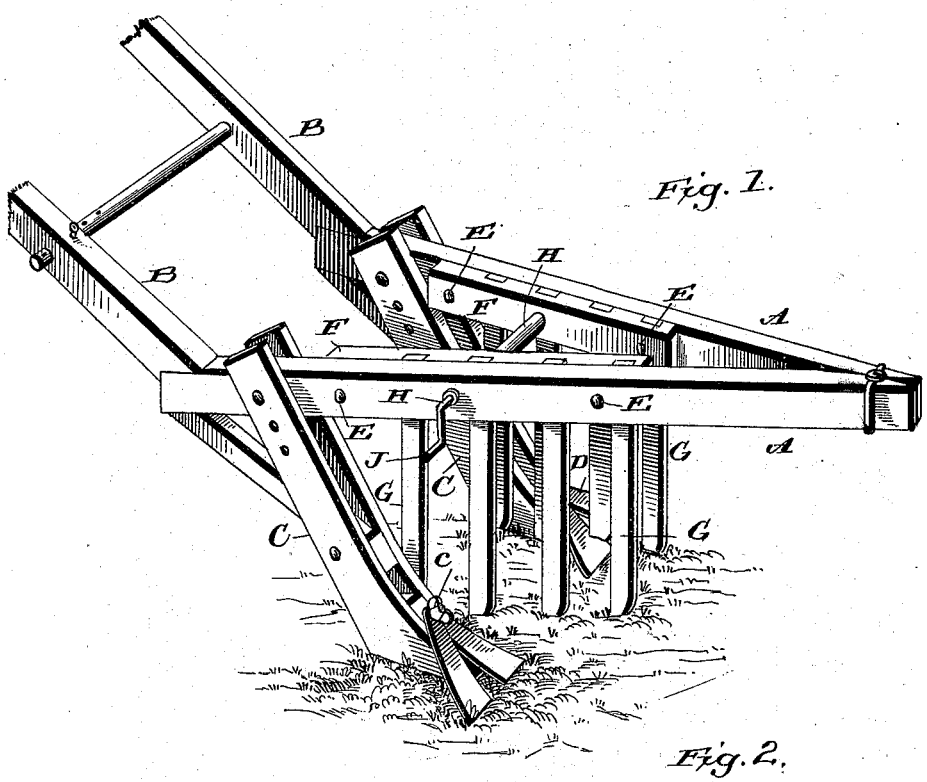
Fig. 1.
Fig. 2.
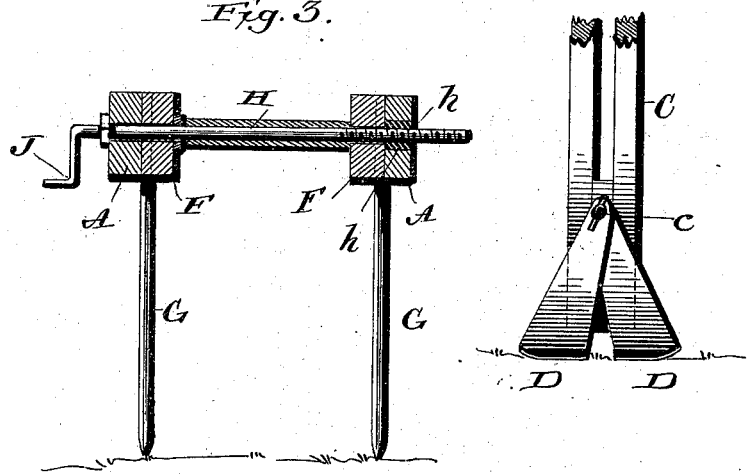
Fig. 3.
Witnesses:
L. C. Hills
A. L. Hough
Inventor
Dudley Brisky,
by Franklin H. Hough
Atty.

UNITED STATES PATENT OFFICE.

DUDLEY BRISKY, OF MILLTOWN, ALABAMA.

CULTIVATOR.

SPECIFICATION forming part of Letters Patent No. 552,684, dated January 7, 1896.

Application filed April 18, 1895. Serial No. 546,246. (No model.)

*To all whom it may concern:*

Be it known that I, DUDLEY BRISKY, a citizen of the United States, residing at Milltown, in the county of Chambers and State of Alabama, have invented certain new and useful Improvements in Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in harrows or cultivators, and especially to the class designed to loosen the soil about the roots of young corn, cotton, &c., and being adjustable the cultivator may be used for making furrows and covering the seed.

To these ends and to such others as the invention may pertain the same consists further in the provision of a machine of this character having a series of adjustable harrow-teeth, which may be removed from the cultivator-beams when it is desired to use the implement for making drills and covering up seed. There being two shovels to each row, and the same being adjustable, the width to which it is desired to make the furrow may be varied.

My invention consists further in the novel construction, combination, and adaptation of the parts, as will be hereinafter more fully described, and then specifically defined in the appended claims.

I clearly illustrate my invention in the accompanying drawings, which, with the letters of reference marked thereon, form a part of this specification, and in which drawings similar letters of reference indicate like parts throughout the several views, in which—

Figure 1 is a perspective view of my invention. Fig. 2 is a detail view of the adjustable shovels. Fig. 3 is a transverse section taken in the line of the crank-shaft H, Fig. 1.

Reference now being had to the details of the drawings by letter, A A represent the two beams of a cultivator to which are secured the handles B B, and C C are standards rigidly fastened to the said beams.

D D are adjustable shovels secured near the lower extremity of the standards, and by means of the thumb-screw c may be held in such positions as to cause a narrow or a broad furrow, as may be desired.

Between the two beams of the cultivator, mounted on the rods E E, are the plates F F, which carry each a series of teeth G.

H is a crank-shaft provided with screw-threads, which engage with threads in the apertures $h\ h$ in the cultivator-beams, and J is a crank-handle. By this arrangement it will be seen that the two plates carrying the teeth may be adjusted so as to work between narrow or wide rows of corn or other plants to be cultivated.

When it is desired to use the shovels for making drills or for covering seed, the plates carrying the teeth may be easily removed from the frame.

Having thus described my invention, what I claim to be new, and desire to secure by Letters Patent, is—

1. The combination with beam, of the standard secured thereto, and the adjustable shovels at the lower end of said standard, and a single thumb screw upon which both of said shovels are mounted and held, said shovels being arranged to have their shanks overlapping and to be adjusted to throw their lower ends farther apart or nearer together, as set forth.

2. The combination with the beam and the standard consisting of two parallel bars one upon each side of the beam and a rod passed through the said bars and beam and threaded at one end to engage screw-threads in the beam, a block between the lower ends of said bars, a thumb screw held in said block, and shovels having their shanks overlapped and held by said thumb screw, all substantially as shown and described.

3. The combination with the beams having their forward ends beveled and pivotally connected together, the plates F F upon the inner faces of said beams, the cultivator-teeth held in recesses between said plates and the beams, the shaft mounted in said plates and beams and provided with a crank handle and threaded into the plate and beam at one side, the sleeve around said shaft between said plates, the standards on the rear ends of the beams, the blocks between the bars of said standards near their lower ends, the shovels on said blocks on said standards and the handles secured to said beams and standards, all substantially as shown and described.

In testimony whereof I affix my signature in presence of two witnesses.

DUDLEY BRISKY.

Witnesses:
GIDEON LEVERETT,
T. M. HENDERSON.